(12) United States Patent
Fiatal

(10) Patent No.: US 9,325,598 B2
(45) Date of Patent: *Apr. 26, 2016

(54) BANDWIDTH MEASUREMENT

(71) Applicant: Seven Networks, LLC, Marshall, TX (US)

(72) Inventor: Trevor Fiatal, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,656

(22) Filed: Dec. 9, 2014

(65) Prior Publication Data

US 2015/0106515 A1    Apr. 16, 2015

Related U.S. Application Data

(63) Continuation of application No. 12/577,213, filed on Oct. 12, 2009, now Pat. No. 8,909,759.

(60) Provisional application No. 61/104,674, filed on Oct. 10, 2008.

(51) Int. Cl.
*G06F 15/16* (2006.01)
*H04L 12/26* (2006.01)
*H04L 29/08* (2006.01)
*H04L 29/06* (2006.01)

(52) U.S. Cl.
CPC ............ *H04L 43/0882* (2013.01); *H04L 67/06* (2013.01); *H04L 69/28* (2013.01)

(58) Field of Classification Search
None
See application file for complete search history.

(56) References Cited

U.S. PATENT DOCUMENTS 7,437,458 B1 * 10/2008 Stewart ............... H04L 12/5695
370/467

* cited by examiner

*Primary Examiner* — Scott B Christensen
(74) *Attorney, Agent, or Firm* — NK Patent Law, PLLC

(57) ABSTRACT

Methods for testing network bandwidth availability in a non-intrusive manner. By implementing occasional, base-line bandwidth testing, a more accurate indication of actual transfer rate results. When an application dependent upon network bandwidth is first executed, a series of file transfers takes place utilizing a series of different sized pieces of content.

10 Claims, 1 Drawing Sheet

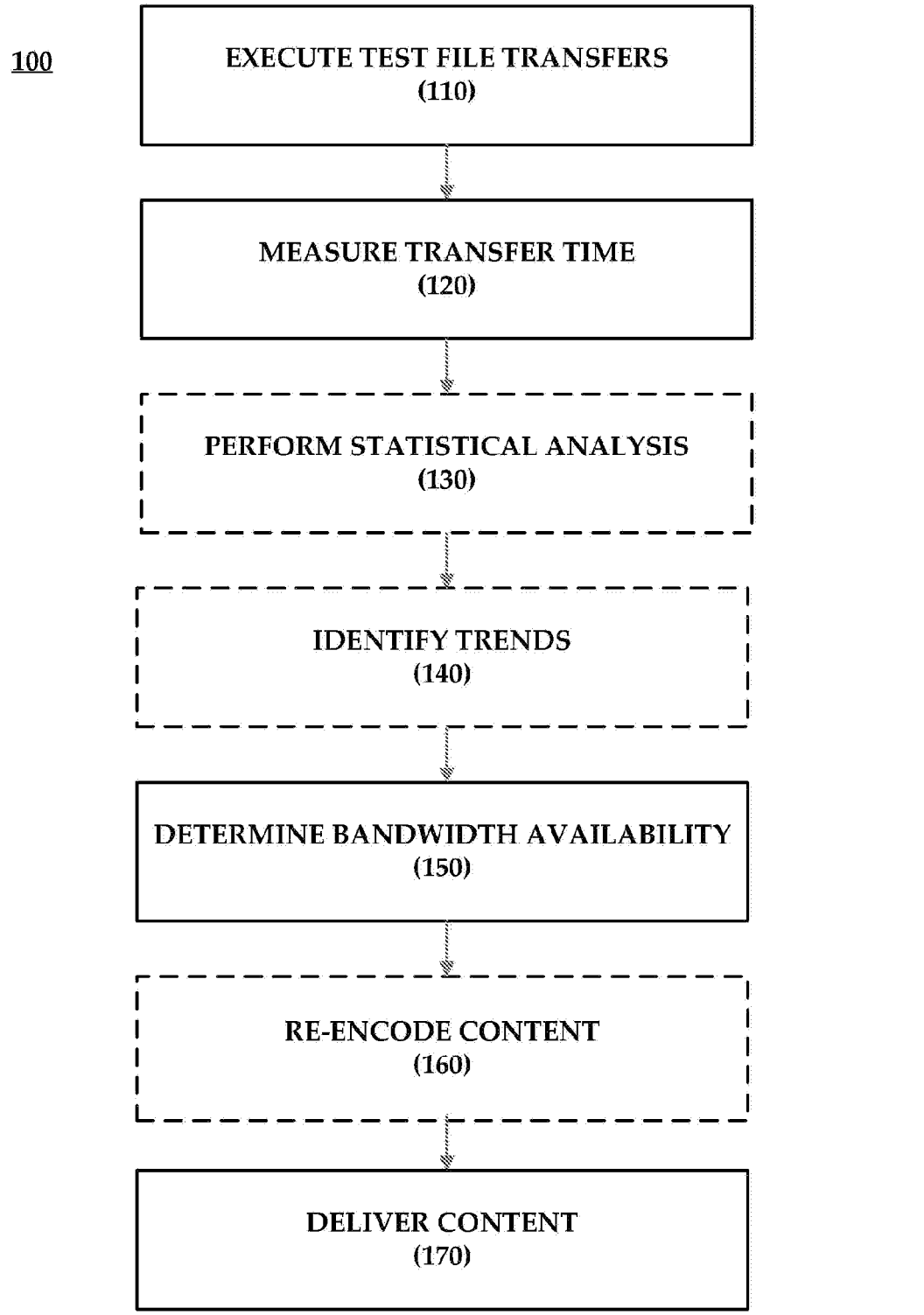

BANDWIDTH MEASUREMENT

CROSS-REFERENCE TO RELATED APPLICATIONS

This application is a continuation of U.S. application Ser. No. 12/577,213 filed Oct. 12, 2009, which claims the priority benefit of U.S. Provisional Application No. 61/104,674 filed Oct. 10, 2008, both of which are incorporated herein by reference in their entirety.

BACKGROUND OF THE INVENTION

1. Field of the Invention

The present invention generally relates to content delivery over a communications network. More specifically, the present invention relates to measurement of actual, transfer bit rate in a communications network.

2. Description of the Related Art

To measure bandwidth availability, any number of various testing methodologies may be employed. In one such testing method, a relatively small file of 0s or 1s is transferred from the content source to a receiving computing device before content is transferred or received. The time to transfer the test file aids in the determination of bandwidth quality and the rate at which requested content can be served to a user.

A determination that the bandwidth between the server and user is of low and/or unreliable quality may result in serving, for example, a lower quality video file. The quality of the content embodied in the lower quality video file is less than that of a file embodying, for example, high definition video content. While the quality of the content is lower, delivery of the file in a timely manner is more likely assured. Serving the lower quality file thereby avoids issues related to packet loss and jitter that would be rampant with respect to the higher quality video file, which is dependent upon high throughput and reliable bandwidth.

In another example, content may be transferred and reside in a user's local cache for viewing. Playback may not begin until several seconds afterward because the content is arriving slower than real time. For example, one second of actual content arrives every two seconds meaning that if content playback began immediately, or even after a few seconds following the initial receipt of content, that the cache of content would soon be 'starved' resulting in hiccups and jitter during playback.

A player application at a client device may 'tune' itself in response to actual bandwidth conditions as they pertain to the arrival of content versus real-world playback speed. This may require that the player be informed of the total playback time so that a determination of total content playback time versus content in cache versus time to receive said cached content may be made. Such information may be included in an initial header file.

In another instance, a user picks bandwidth quality and content is transferred in light of that selection. In most instances, a user does not know the quality of their bandwidth much less total available bandwidth. As such, a user makes a best guesses that is likely to adversely affect content playback.

The aforementioned testing methods are intrusive and time consuming with respect to providing 'instant-on' playback of content while operating in light of network constraints. There is a need for determining an actual bandwidth situation without intrusive and/or inaccurate testing methodologies as part of an integrated content delivery system.

SUMMARY OF THE INVENTION

A method for measuring bandwidth is disclosed. Through the method, a series of files are requested, the size of the series of file being known. The request takes place without user intervention. The time for the series of files to be received is measures and the actual bandwidth availability is calculated based on the size of the series of files divided by the time to receive the series of files. A request for a piece of content is then made. The request for content is accompanied by information concerning actual bandwidth availability. The content is then received.

BRIEF DESCRIPTION OF THE DRAWINGS

FIG. 1 illustrates a method for implementing occasional, base-line bandwidth testing.

DETAILED DESCRIPTION

FIG. 1 illustrates a method 100 for implementing occasional, base-line bandwidth testing to result in a more accurate indication of actual transfer rate. When an application dependent upon network bandwidth is first executed, a series of file transfers takes place in step 110 utilizing a series of different sized pieces of content (e.g., files ranging from small to large).

In the prior art, only small files are used (e.g., a file of only 0s or 1s). This sampling in the prior art is too small to be relied upon with any degree of accuracy, especially when the test is made in the context of a soon-to-be-transferred media file such as a two-hour high definition movie. Instead, 100 thumbnail files may be transferred resulting in a large byte stream more indicative of actual delays. Subsequent calibrations may be made to ensure that the bandwidth conditions are kept up-to-date.

These transfers may be executed through Remote Procedure Call (RPC) where a bandwidth testing application (in accordance with one or more rules and/or algorithms) requests delivery of test content from a server. The size of the test file is known in advance (e.g., one-hundred, 20-KB files) as is the start time (when the RPC is made). Once the final file is received, the finish time is likewise known.

A careful measurement of transfer time may then be made in step 120. Measurement of transfer time takes into account actual packet loss and stoppages in transfer as those events may be measured in the context of having full content of the file transfer taking place in light of those events (e.g., file size, nature of the file, start/stop time). Testing may take place continuously, according to a schedule, or randomly depending on other transfers taking place (or not taking place) over the network. As a result, up-to-date surveillance of network bandwidth may take place without intrusive testing.

For example, as a user is browsing through thumbnails or descriptions of available content, testing may be taking transparently taking place in the background. Thus, when the user makes an actual selection of content, bandwidth conditions are already known and transfer may take place in light of the bandwidth measurement. In some instances, as a user browses or investigates a particular piece of content, testing may take place that is specific to some particularity of that piece of content as it concerns file format, size, number, or metadata, for example.

Measurements may also be based on metadata related to that content as it is being browsed. For example, as a user is browsing through a library of content, metadata is being transferred to provide the user with information about the browsed content. The transferred metadata may be the content used for the measurement.

In some instances, a series of measurements might be used to create an even more accurate measurement of bandwidth through statistical analysis in optional step 130. For example, a series of measurements might take place every 30 seconds. A first measurement might coincide with another network event that is causing significant network congestion, that event being a one-time anomaly. If the measurement were based on that sole instance, however, network availability might be indicated as being lower than is actually available. A series of five additional measurements taken over the next 2½ minutes would reflect that the first measurement was such an anomaly. Anomalies may be included as a part of a final measurement and prediction or may be thrown out as having been recognized as anomalies. Various statistical tools or methodologies may be used in this context including the arithmetic mean (i.e., the average), mode, or median.

Trends may be identified over particular periods of time in optional step 140. For example, a trend over time may be combined with an actual measurement in the here-and-now. Statistical analyses performed in step 130 may also be introduced into identification of such a trend. As such, predictions for network conditions on a Monday at 2 PM may be combined with an actual measurement (which may be near the same) to be used as a predictor. Such a measurement would differ significantly versus a measurement at 2 PM on a Saturday when the network in question is an office network. Likewise, the measurements would probably differ significantly if the network was a home network.

Ultimately, bandwidth availability is determined at step 150. This determination may involve only steps 110 and 120 or may additionally incorporate steps 130 and/or 140 with respect to statistical analyses and/or identification of trends. The end result is a determination as to bandwidth availability at any given date and time with respect to a particular network. These determinations may, in and of themselves, be maintained as a part of a library later referenced in a statistical analysis or identification of trends.

In light of the determination arrived at in step 150, and in practical application, a user might have apiece of content that is encoded at 700 Kbits. A WiFi connection for a mobile device may have an effective transfer rate of 400 Kbits, the transfer rate arrived at through the method described above. Trying to transfer this content may result in packet loss. Based on the aforementioned testing methodology, when the request for actual content delivery takes place, an indication that the transfer cannot take place in excess of 400 Kbits may be delivered to the content server. The content server may utilize a codec engine that re-encodes the 700 Kbit file into a 350 Kbit file to avoid exceeding network capacity. Such re-encoding may take place in optional step 160.

Content is ultimately delivered in step 170. Content may be delivered in response to a request for content, the request accompanied by information concerning actual bandwidth availability as determined in step 150. The delivered content may be re-encoded content as a result of a re-encoding operation that took place in step 160 and further in light of the need to re-encode the content. Content may be delivered at a lower bit rate as a result of a pre-existing lower bit rate file having been selected from a number of available files. Content may further be delivered utilizing brute force with a notification to the user that the existing network bandwidth is not optimal to the selected content and that an interruption in delivery or other quality of services issues may result. Alternatively, content not ideal to the tested network may simply be made unavailable to the user either for delivery or initial selection.

An exemplary system that could implement this testing methodology is described in U.S. patent application Ser. No. 12/002,300 filed Dec. 13, 2007 and entitled "Content Delivery to a Mobile Device from a Content Service," the disclosure of which is incorporated herein by reference. The aforementioned testing methodology may be implemented through software stored in a computer readable storage medium. Such software would be executable by a processor device operable to access and retrieve software instructions from the aforementioned storage medium. Such a testing methodology may be executed from a client or a server or at an intermediate computing device thereby between.

The embodiments illustrated, described, and/or discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The invention claimed is:

1. A method for measuring bandwidth available to a mobile device, the method comprising:
   in response to user browsing of content stored on a content server via the mobile device, transferring the content to the mobile device over a network to satisfy the user browsing of the content;
   while the user continues to browse the content:
      determining any other transfers taking place over the network;
      transparently measuring a plurality of transfer times of the transferred content based in part on actual packet loss and stoppages in the transfer;
      wherein based on the determining any other transfers taking place over the network, the measuring of each of the plurality of transfer times is performed at least one of continuously, according to a schedule, or randomly to ensure up-to-date measurements while preventing intrusive measuring;
   determining a plurality of measured bandwidths based on the measured plurality of transfer times;
   determining a network bandwidth to the mobile device based on performing statistical analysis of the determined plurality of measured bandwidths to reduce or remove any impact of anomalous bandwidth measurements;
   based on the statistical analysis, storing the determined network bandwidth in a log of other determined bandwidth measurements, the log including times that each stored bandwidth measurements was determined;
   identifying trends based on the stored bandwidth measurements;

based on the identified trends and the determined network bandwidth, determining an effective transfer rate for transferring content to the mobile device; and providing the effective transfer rate to the content server;

wherein the content server, based on the effective transfer rate and based on a selection of a selected content by the mobile device, optimizes the selected content such that during transfer of the selected content to the mobile device, the effective transfer rate is not exceeded.

2. The method of claim 1, wherein optimizes the selected content comprises re-encoding the selected content.

3. The method of claim 1, wherein optimizes the selected content comprises selecting different formats of the same content.

4. The method of claim 1, wherein, the user browsing includes browsing through thumbnails.

5. The method of claim 1, wherein, the user browsing includes browsing through description of the content.

6. A system for measuring bandwidth available to a mobile device, the system comprising:
   a processor;
   a memory having instructions stored thereon that when executed by the processor cause the system to:
      in response to user browsing of content stored on a content server via the mobile device, transferring metadata to the mobile device over a network to satisfy the user browsing of the content;
   while the user continues to browse the content:
      determining any other transfers taking place over the network;
      transparently measuring a plurality of transfer times of the transferred content based in part on actual packet loss and stoppages in the transfer;
      wherein based on the determining any other transfers taking place over the network, the measuring of each of the plurality of transfer times is performed at least one of continuously, according to a schedule, or randomly to ensure up-to-date measurements while preventing intrusive measuring;
      determining a plurality of measured bandwidths based on the measured plurality of transfer times;
      determining a network bandwidth to the mobile device based on performing statistical analysis of the determined plurality of measured bandwidths to reduce or remove any impact of anomalous bandwidth measurements;
      based on the statistical analysis, storing the determined network bandwidth in a log of other determined bandwidth measurements, the log including times that each stored bandwidth measurements was determined;
      identifying trends based on the stored bandwidth measurements;
      based on the identified trends and the determined network bandwidth, determining an effective transfer rate for transferring content to the mobile device;
      providing the effective transfer rate to the content server;
      wherein the content server, based on the effective transfer rate and based on a selection of a selected content by the mobile device, optimizes the selected content such that during transfer of the selected content to the mobile device, the effective transfer rate is not exceeded; and
      storing the network bandwidth availability information in a library.

7. The system of claim 6, wherein optimizes the selected content comprises re-encoding the selected content.

8. The system of claim 6, wherein optimizes the selected content comprises selecting different formats of the same content.

9. The system of claim 6, wherein, the user browsing includes browsing through thumbnails.

10. The system of claim 6, wherein, the user browsing includes browsing through description of the content.

\* \* \* \* \*